US010162590B2

(12) United States Patent
Ritter

(10) Patent No.: US 10,162,590 B2
(45) Date of Patent: Dec. 25, 2018

(54) VIDEO WALL SYSTEM AND METHOD OF MAKING AND USING SAME

(71) Applicant: Brendan Jacob Ritter, Arlington, VA (US)

(72) Inventor: Brendan Jacob Ritter, Arlington, VA (US)

( * ) Notice: Subject to any disclaimer, the term of this patent is extended or adjusted under 35 U.S.C. 154(b) by 115 days.

(21) Appl. No.: 14/703,607

(22) Filed: May 4, 2015

(65) Prior Publication Data

US 2016/0328202 A1    Nov. 10, 2016

(51) Int. Cl.
*G06F 3/14*    (2006.01)
*H04N 9/12*    (2006.01)

(52) U.S. Cl.
CPC .......... *G06F 3/1431* (2013.01); *G06F 3/1446* (2013.01); *H04N 9/12* (2013.01); *G09G 2340/0407* (2013.01); *G09G 2340/0464* (2013.01); *G09G 2356/00* (2013.01); *G09G 2370/12* (2013.01); *G09G 2370/16* (2013.01)

(58) Field of Classification Search
None
See application file for complete search history.

(56) References Cited

U.S. PATENT DOCUMENTS

| 5,523,790 A | 6/1996 | Kalua | |
|---|---|---|---|
| 5,993,005 A | 3/1999 | Geranio | |
| 7,262,746 B2 | 8/2007 | Lagarrigue | |
| 8,911,291 B2 | 12/2014 | Liu | |
| 2003/0015632 A1* | 1/2003 | Dunn | A47B 81/065 248/122.1 |
| 2004/0125044 A1* | 7/2004 | Suzuki | G06F 3/011 345/1.1 |
| 2004/0233189 A1* | 11/2004 | Masuda | G09F 7/06 345/204 |
| 2006/0020723 A1* | 1/2006 | Chia-Chun | G06F 13/385 710/62 |
| 2008/0066124 A1* | 3/2008 | Igoe | H04L 12/2809 725/81 |

OTHER PUBLICATIONS

Accell, "UltraAV® Mini DisplayPort 1.2 MST Multi-Display Hub", posted Jun. 25, 2014, Accell, https://web.archive.org/web/20140625081724/http://www.accellcables.com/products/ultraav-mini-displayport-1-2-mst-multi-display-hub.*
Electrosonic, Your Digital Journey, The Digital upgrade program for Giant Screens, 320 North San Fernando Blvd Burbank, California 91504 USA, Downloaded May 2015.
Planar Systems, Indisys Extensity Video Wall Processor, Dec. 2014.

\* cited by examiner

*Primary Examiner* — Sarah Le
(74) *Attorney, Agent, or Firm* — Vorys, Sater, Seymour and Pease LLP; Vincent M DeLuca

(57) ABSTRACT

The system is comprised of a hub which in turn is made of a housing, at least one video input port, at least two video output ports, a digital card enabling communication between a computer and at least one display without a direct physical connection and a processor. The hub is used to make a video wall.

15 Claims, 7 Drawing Sheets

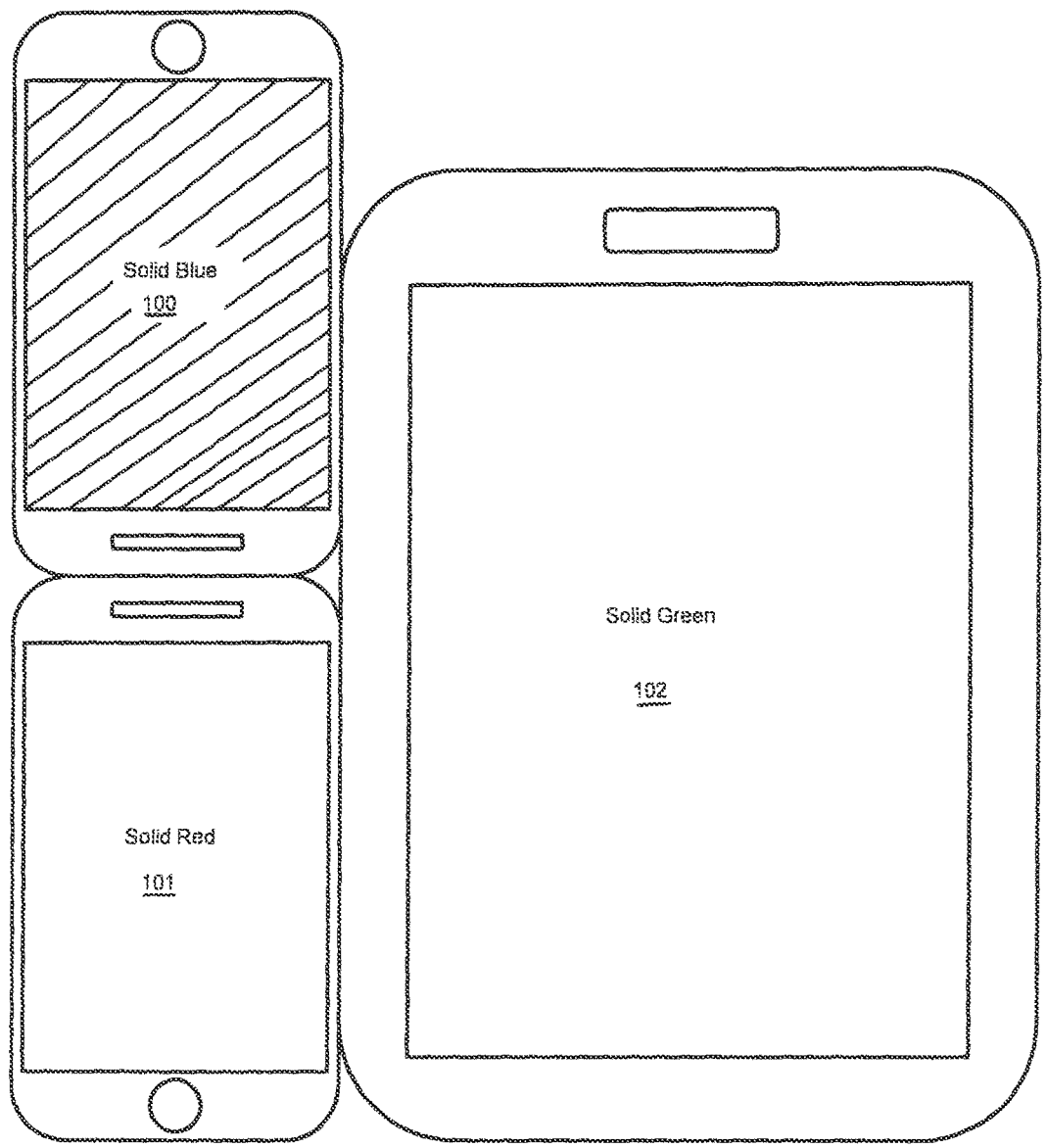

VIDEO WALL SYSTEM AND METHOD OF MAKING AND USING SAME

BACKGROUND

Current display technologies are too small and static to allow for both detailed viewing and mobility. Some, like projectors, televisions and large desktop monitors provide detailed viewing but are difficult to set up, assemble or use, limiting their mobility. Mobile displays like laptop screens, tablets and smartphone screens might be high resolution and mobile, but are small in size. This small size reduces their usefulness for the user, who might want to share the screen with others, or type while viewing a piece of information on screen, reducing the space available for that information.

SUMMARY

A first embodiment described here is a hub comprising: a housing, at least one video input port formed on the housing that is configured to connect to a digital video source, at least two video output ports formed on the housing that are configured to connect to a digital video wall, a digital card enabling communication between a computer and at least one display without a direct physical connection, and a processor connected to the video input ports, video outputs ports, and digital card.

Another embodiment described herein is a video wall comprising: at least first and second separate and adjacent video displays arranged in a plane, the first and second displays having at least one of different sizes and different aspect ratios, wherein different portions of a single video image are provided on each of the first and second video displays.

BRIEF DESCRIPTION OF THE DRAWINGS

FIG. 9 shows one version of a configuration image.

DETAILED DESCRIPTION

Figure 1:
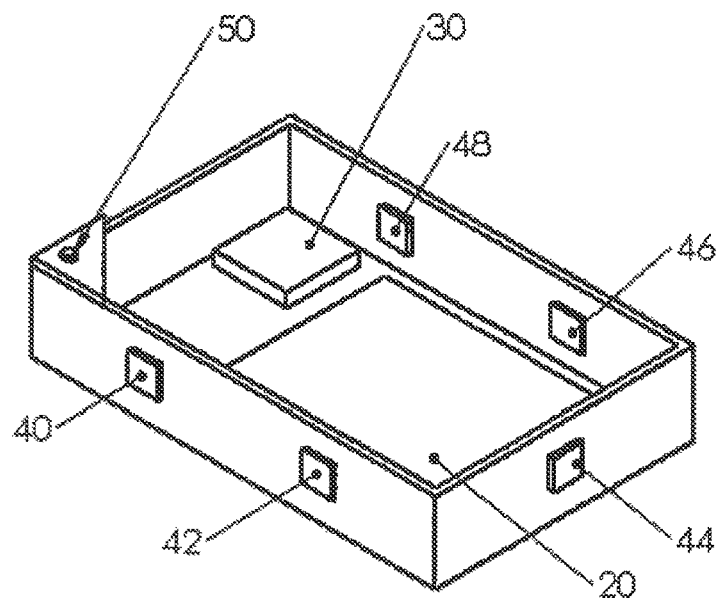
FIG. 1 is a perspective view of an embodiment of a hub with the top shown transparent to allow viewing of the internals.

One embodiment described herein is a hub containing one input and several video outputs, it takes this video input and splits it among the outputs in relation to their size. This split video output then gets routed to a number of displays. Together they form a large display; the video wall. The hub contains a wireless card to allow for many types of devices to be used as displays.

Another embodiment described herein is a system for creating ad hoc video walls out of any number, size or dimension of display. This system is suitable for the consumer market with special importance on the developing mobile industry. It is similar in some ways to previous video wall technology but with a form factor conducive to mobility and flexibility. Towards this end it will allow for multiple display types and be able to connect to these displays either through cables or wirelessly.

Current video wall technology focuses on large permanent walls used in either entertainment, like performances, museums or stadiums, or in business applications, like large real time plant schematics or conference screens. However, the reason for these locations is that they all allow or necessitate large, expensive and permanent video walls which are configured once and never moved. This system on the other hand suggests that video walls don't have to be on actual walls. They are not inherently limited to being in one viewing plane either, although image distortion may occur in some cases if the displays are on multiple planes. In contrast to current video wall technology, the embodiments described herein provide a fast, adhoc and dynamic way of configuring and using video walls.

As used herein, a "computer" includes Laptops, netbooks, desktops, smart devices, tablets, mobile devices, or any other device containing a microprocessor; generally, any device that can be programmed to carry out a set of arithmetic or logical operations.

A "display" or "video display" is a device which is capable of displaying arbitrary visual information and capable of interfacing with a computer. This can include desktop or laptop monitors, televisions and projectors.

A "video wall" is a large display formed by aligning separate displays adjacent to one another.

"Attaching" two objects means holding them temporarily or permanently together through the use of means similar to but not limited to adhesive, fasteners, ties, magnets, clips or screws.

Referring now to the drawings, FIGS. 1-4 show the suggested dimensions and features of one embodiment of the Video Hub. The top of the hub is shown transparent in FIGS. 1-2 to allow viewing of the internals. The drawing include orthographic and well as isometric projections. All dimensions are in inches.

The hub can be elongated for as many ports as needed, however, three is the minimum number of ports.

Figure 2:
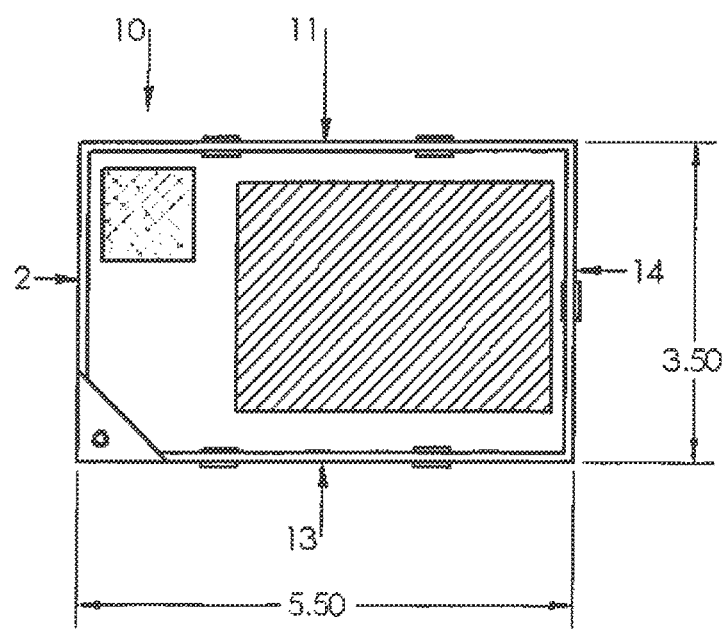
FIG. 2 is a top plan view of the embodiment of FIG. 1.
Figure 3:
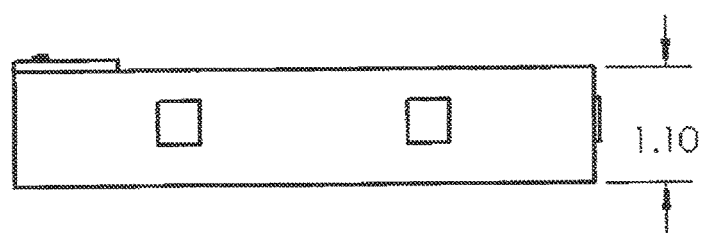
FIG. 3 is a side view of the embodiment of FIG. 1 along the length of the hub.
Figure 4:
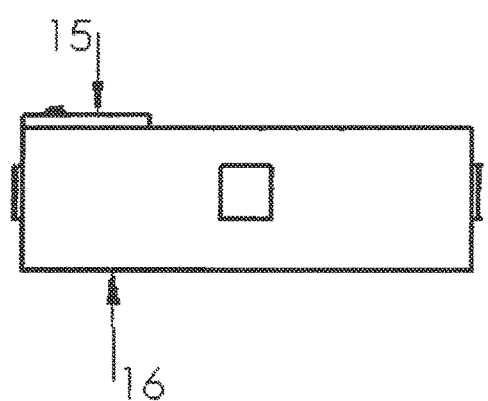
FIG. 4 is a side view of the embodiment of FIG. 1 along the width of the hub.

In FIG. 2 component 10 is the hub itself. Components 11-14 are the sides which make up the case of the hub. They have holes in them to allow for the ports. In FIG. 4, components 15 and 18 are the top and bottom of the hub. 15 has a hole for the configuration button. The hole for power may be located in any face 11-16.

In FIG. 1, components 40-48 are video ports. These may either be digital ports like the HDMI standard, or analog, like the VGA standard or both. While the hub includes at least one input port and at least two output ports, the particular embodiment shown in FIG. 1 has input port 44 and output ports 40, 42, 46 and 48.

Component 30 is the digital wireless card. The function of component 30 is to allow communication with video sources and displays without a physical connection. This card could be, but is not limited to, a wifi, bluetooth or radio transceiver. The use of this card is optional and it is only used when either or both video source or one or more displays require the use of a wireless connection. A good example would be a smart phone, which doesn't easily transmit its video information across its only port, a micro USB. In this case, the card could communicate either with the phone's bluetooth or wifi capabilities in order to receive this information.

Component 20 is the processor. The processor takes in positional information of the screens, and determines through this information how the video source must be apportioned to display correctly on the video wall. The processor also handles communication between the physical ports and the wireless card. In some embodiments, the processor 20 has an associated memory. In some embodiment, the processor 20 is part of a computer, which includes a memory.

Component 50, the configuration button, displays one unique configuration image on every connected display for a period of time. During this time, the user relays all positions of configuration images back to the hub. The use of this is to determine where the position of all connected displays are in space.

Figure 5:
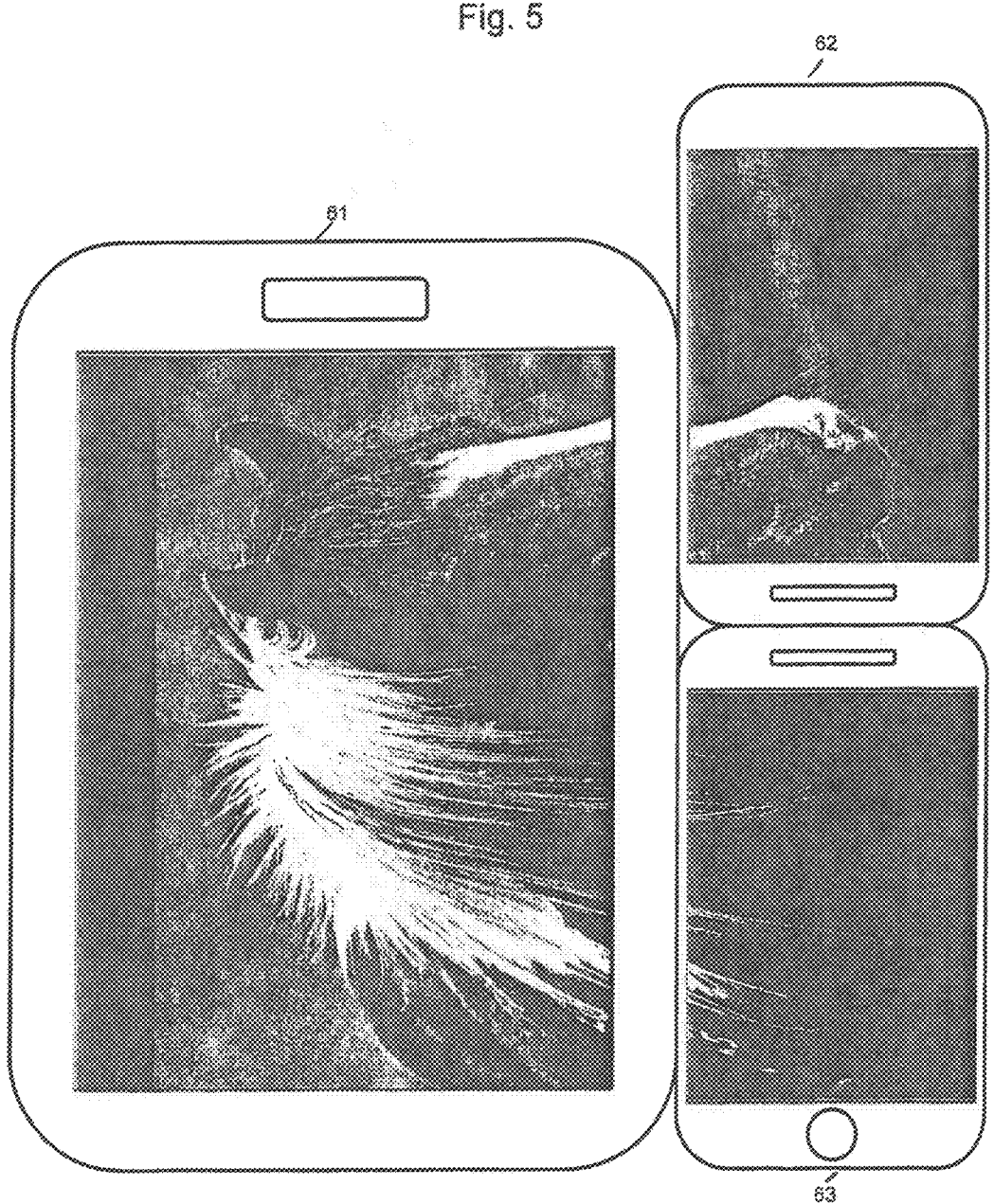
FIG. 5 shows an example of a picture on a video wall.

FIG. 5 is a rendering of one incarnation of the video wall. The Video Source is being displayed on multiple mobile device displays. The video source is a computer, playback device or any other device which outputs video. This video source is attached, either physically to an input port on the hub or synched to the wireless card.

Component 61 is a tablet. Components 62 and 63 are smart phones. The hub is not shown in this figure. All components would be communicating with the hub using the wireless card.

The tablet 61 and smart phones 62 and 63 optionally are mounted on a stand 64. The purpose of the stand would be to physically hold the displays in space adjacent to one another. This stand would support the displays from the rear and provide the ability to move the entire video wall as one device, allowing for quick movement and adjustment.

This use case is especially important as the use of mobile devices increases. The use of this technology in such a way would allow for increased social interaction through shared multimedia experiences as well as a sense of inclusion in physically making the Video Wall together with one's friends.

An important note is that the inclusion of the edges of the displays in this picture is purposeful and over exaggerated to convey that the overall quality of the Video Wall made depends heavily on the choice and configuration of displays. In practice one would want to select Displays with small edges. Display technology is moving towards smaller edges, so this video wall technology will only increase in usefulness as time progresses.

Finally, it is important that the picture is cut off in this example. This is in fact one unique feature of the Video Wall System; that the Displays can have irregular sizes and positions. Video Sources too large in resolution for some embodiments of the Video Wall may be cut off; Video sources too small for some embodiments of the Video Wall may be filled in with blank screen. However, in the ad hoc use case of mobile devices, it is more important to be able to share easily and quickly than perfectly.

Figure 6:
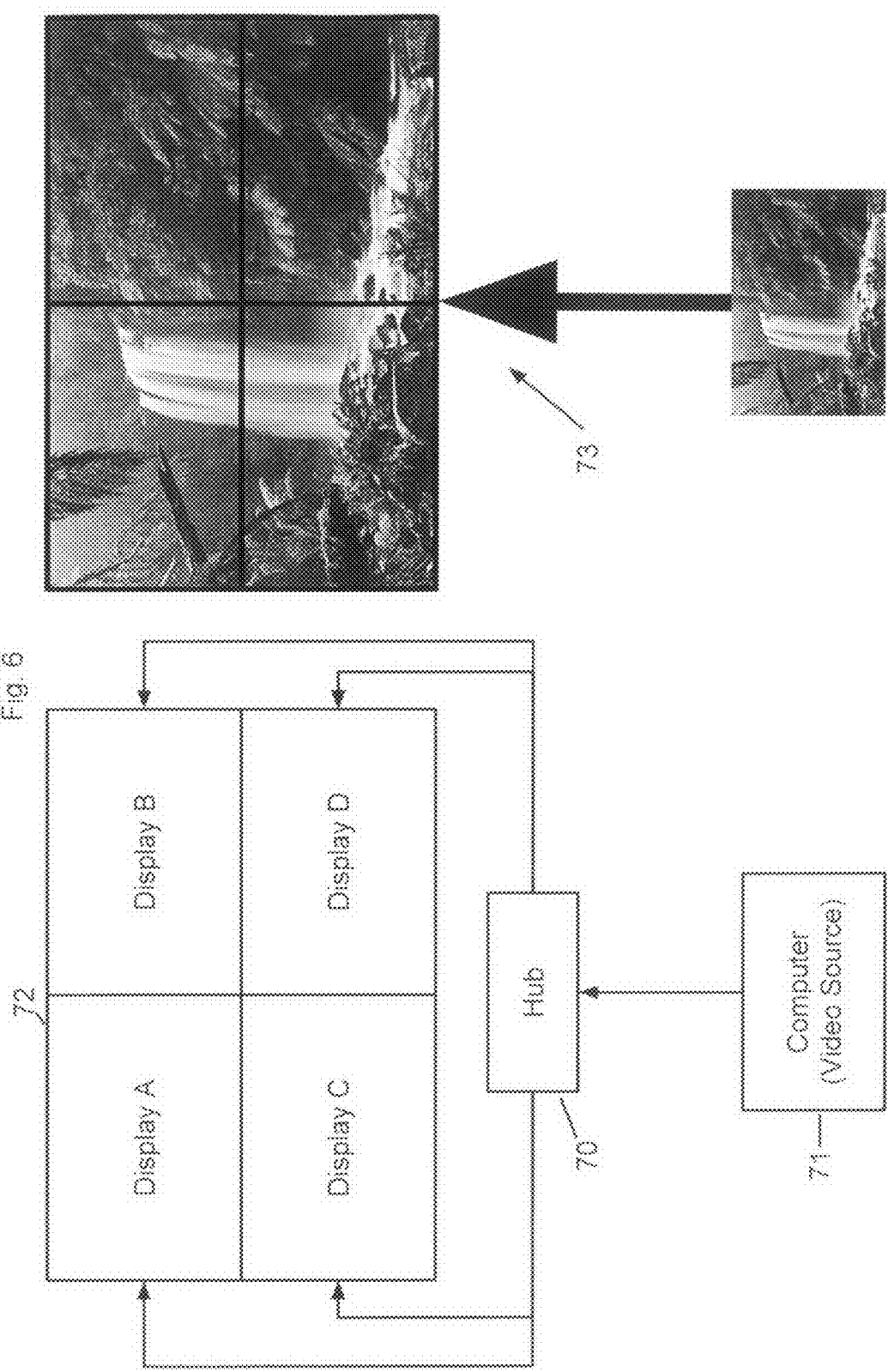
FIG. 6 shows the relationship of the hub to the displays and video source.

FIG. 6 is a combined flow chart and conceptual drawing showing an overview of the flow of information from the source to the screens.

Component 70 is a hub, 71 is a video source and 72 is a video wall made out of four displays, Component 73 is a visualization of how this system might show a sample image.

It is important that no information travels directly from the Video Source to the Displays. If that were to happen, one could only duplicate the Video Source across all screens, all showing the same thing. The hub is what allows the displays to act as one display.

It is worth noting from a technical standpoint that the resolution of the Video Source will necessarily be degraded when it is stretched onto a large collection of displays. However, this is no different from any other external monitor or projector. Furthermore, this can be combated by setting the Video Source's resolution higher, if that is an option with a particular system.

Figure 7:
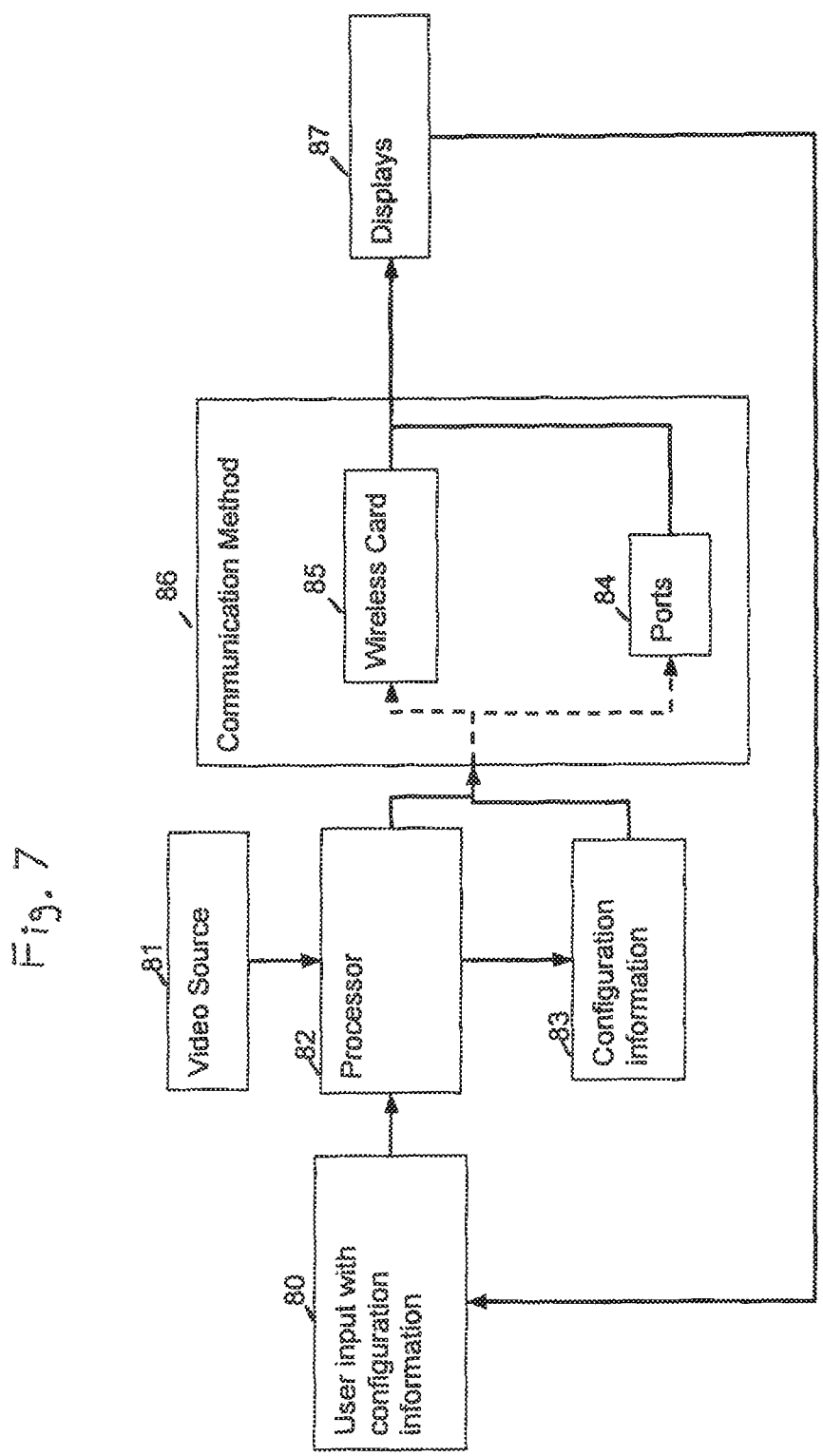
FIG. 7 shows the flow of information for the video wall.

FIG. 7 shows how all the different parts of the Video Wall System share information. All arrows show information moving from subsection to subsection. Dotted arrows denote optional paths. Information may travel down either or both optional paths.

Component 81 is the video source.

Component 86 schematically shows the communication method between the processor (82) and the displays (87). St can be actualized through either physical ports (84) or wirelessly (85).

Component 83 is the configuration information described more fully in FIG. 9. It is generated by the processor (82) and sent to the video wall.

Component 80 described some form of user input with configuration information.

FIG. 7, particularly the connections between 87, 80 and 82 reveal a key feature of the system. These connections describe a feedback loop which allows the processor to understand where it's connected displays are in real space, helped through the use of the configuration images that it has generated. This user input is required because unless the displays have positional sensors of their own, there is no way of the hub knowing where they are located.

In the use case of mobile devices as displays it might be possible to use the display's built in positional sensors like GPS or relative wireless signal strength to determine where the displays are in relation to one another automatically. In this case the user would simply provide a yes or no as to whether the automatic configuration was performed properly. If not, the system would try again, but take more time to increase the spatial accuracy until it achieved a configuration that pleased the user.

Thus, the actual method by which this information is transmitted is left to the user and specific to the embodiment of the video wall. However, one easy way to accomplish this feedback loop using simple non-sensored displays would be to simply take a picture of the video wall as it displays the configuration images and then communicate that information back to the processor via the wireless card (all easily done via a smartphone or similar technology)

Once the processor receives this information it can then compute where its displays are in real space. For example, if it sends a solid red configuration image to a connected display, when it receives the image of the video wall, that red display might be in the upper left corner. Using these configuration images thus allows the processor to figure out the relative geometries and positions of each of the displays in the video wall, and thus the wall in its entirety.

Once the processor understands the geometry of the video wall, it knows what sections of the video source to send to which display and at what aspect ratio.

Figure 8:
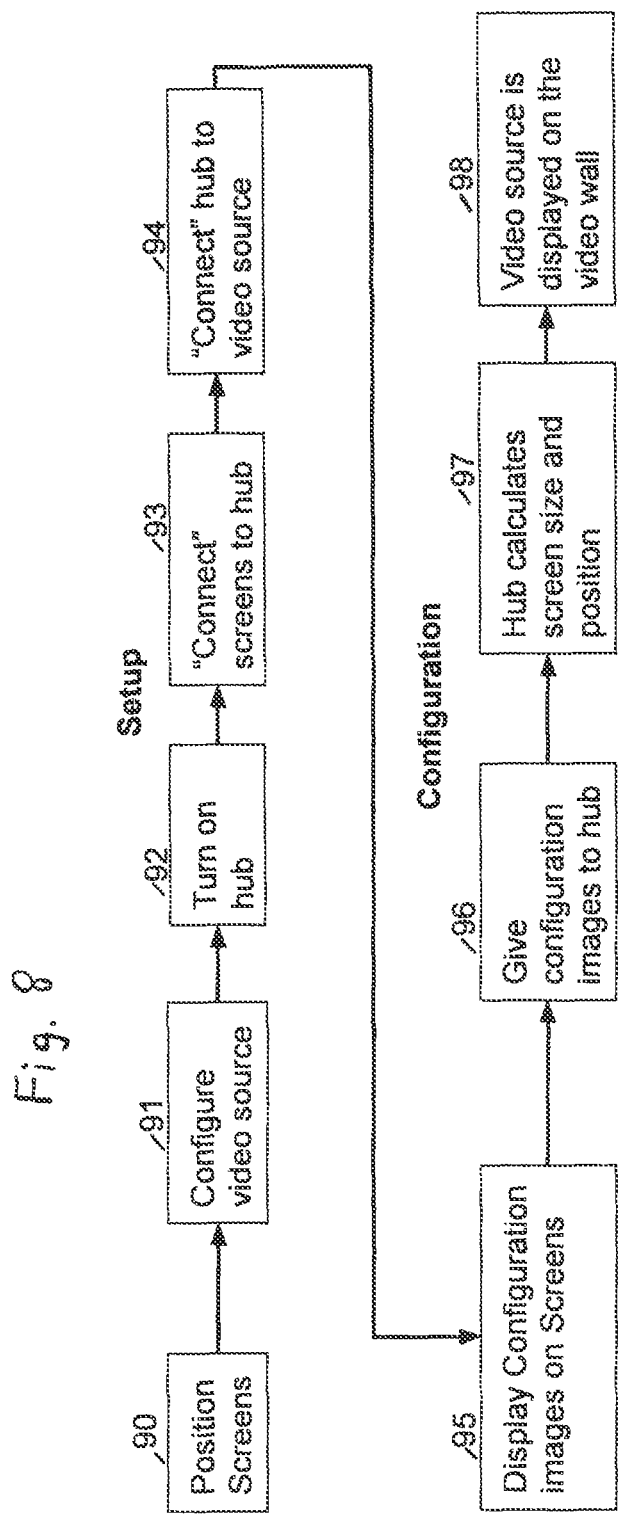
FIG. 8 depicts the steps involved in setting up the video wall system.

FIG. 8 is a flowchart of setting up the entire Video Wall System. All arrows show progression of tasks in time relative to one another. The tasks are split up into two conceptual groups, the Setup and the Configuration groups. The Configuration group is described in more detail in FIG. 9.

Component 90, the first step, is to position screens. Then in 91, the video source is configured. This means that whatever device is being used as the video source, must at this point, be capable of generating video information, for instance, it must be turned on or in the right mode or setting.

In 92 the hub is turned on. The order between 92 and 91 is not important and may be reversed if needed.

In 93, the screens are connected to the hub and then in 94, the hub is connected to the video source.

Next, in 95, the configuration images are displayed on the screens. In 96 these configuration images are given bask to the hub. In 97 the hub calculates the screen size and position information. In 98 the video source is displayed on the video wall.

FIG. 9 shows one possible incarnation of the configuration images supplied to the Video Wall System user. In this example, multiple colors, one for each display are generated by the Video Hub and displayed on each display. The user then transmits this information to the video hub as described in FIG. 7.

Components 100 and 101 are smartphones that have been told by the hub to generate solid blue and solid red configuration images. Component 102 is a tablet that has been told by the hub to generate a solid green configuration image.

The actual incarnation of the configuration image is not important. Possible configuration images could be but are not limited to solid colors, simple patterns, QR codes or simple shapes. All that matters is that the configuration images present general shapes or colors which are easily distinguishable from their surroundings and from each other, especially on the edges of the screens. This is because image recognition methods performed by the video hub are dependent on a clear and easily distinguishable set of images to understand the location of all devices in the real world.

Method: Manufacturer's Approach to Making the Hub.
1. Create or manufacture a two part shell for the hub which can interlock or fasten. This shell can be made out of any material including but not limited to plastics and metals. There are at least five holes in the shell, one for power, one for the configuration button, the rest for video ports.
2. Obtain or fabricate a wireless card.
3. Obtain or fabricate a button. This will be the configuration button.
4. Obtain or fabricate a computer. The computer must be capable interfacing with video output and input through a port. The computer must be capable of interfacing with the wireless card.
5. Obtain or fabricate an electric battery. The battery will provide a backup to the hub, powering both the wireless card and the computer. This will also allow the hub to be used on the go.
6. Obtain or fabricate at least three video ports. Usually, 1-2 input ports and 2-8 output ports will be included.
7. The wireless card is attached to the computer. The computer is attached to all the ports. The battery is connected to both the computer and the wireless card. The configuration button is attached to the computer. This is the electric subsystem.
8. The electric subsystem is attached to the bottom shell, the ports are attached to the bottom shell holes. The top shell is attached to the bottom shell.

Method: Constructing the System
1. Obtaining several video displays, the hub and the video source.
2. Arranging these components into a cohesive whole.
3. Configuring the video source. This means obtaining a device capable of producing streaming video output. This could be but is not limited to: a laptop, a video game system, a camera or a mobile phone.
4. Turning on the hub.
5. Connecting these displays to the hub.
6. Connecting the hub to the video source.
7. Pressing the configure button. A series of images then appears, one on each display. These images are produced by the hub and are visually distinct.
8. Relaying the position of these images to the hub. This could be but is not necessarily through use of a camera. Once this information is received by the hub, it calculates the position and scale of all displays connected to the hub.
9. The video source is displayed on the video wall, accounting for each screen's scale and position.

The invention claimed is:

1. A video hub for enabling a plurality of variously sized display devices to function as a unitary composite display of a single video source, the hub comprising:
 a housing;
 at least one processor mounted in said housing and configured to
  receive an input video source signal,
  receive configuration information for a plurality of display devices, wherein said configuration information includes a display size of each of said plurality of display devices and a relative location of each of said plurality of display devices with respect to each other,
  apportion said input video source signal over said plurality of display devices in accordance with said configuration information to generate a plurality of apportioned video signals;
 a configuration input enabling a user to indicate configuration information to said processor; and
 an output configured to output the apportioned video signals to the plurality of display devices.

2. The video hub of claim 1, wherein the input video source signal is provided to said processor from at least one of a memory, computer to computer port, built in camera, or internet enabled wireless card.

3. The video hub of claim 1, wherein the hub further includes a first video port configured to receive data having a first video standard, and a secondary video input port configured to receive data having a second video standard different from said first video standard.

4. The video hub of claim 1, wherein the hub further includes a plurality of video output ports wherein each video output port is configured for a different video standard.

5. The video hub of claim 1, further comprising at least one video input port formed on the housing, which is configured to connect to a digital video source and to provide a video signal from said digital video source to said processor.

6. The video hub of claim 1, further comprising at least two video output ports formed on the housing, which are configured to connect to respective display devices of said plurality of display devices.

7. The video hub of claim 1, further comprising a wireless communications card configured to enable wireless communication between said processor and at least one of said plurality of display devices.

8. The video hub of claim 7, wherein said wireless communications card is a WiFi-enabled card.

9. The video hub of claim 7, wherein said wireless communications card is a Bluetooth-enabled card.

10. A video wall comprising:
 a plurality of separate and adjacently arranged video display devices, at least one of said plurality of video display devices having a size and/or aspect ratio that is different from another of said plurality of video display devices; and a video hub configured to provide different portions of a single video image to each of the plurality of video display devices in accordance with the size and/or aspect ratio of that video display device, whereby images displayed on each of said plurality of display devices combine to form a composite display of said single video image, said video hub comprising a configuration input enabling a user to indicate configuration information for said plurality of video display devices.

11. The video wall of claim 10, wherein at least one of said plurality of video display devices is physically connected to an output port of said video hub.

12. The video wall of claim 10, wherein at least one of said plurality of video display devices is synched to a wireless card of said video hub.

13. A method of providing a composite display of an image from a single video source on a plurality of variously sized display devices, comprising:

receiving an input video source signal from a video source;

receiving configuration information for a plurality of display devices, wherein said configuration information includes a display size of each of said plurality of display devices and a relative location of each of said plurality of display devices with respect to each other, said configuration information being received from a configuration input enabling a user to indicate said configuration information;

apportioning said input video source signal over said plurality of display devices in accordance with said configuration information to generate a plurality of apportioned video signals; and outputting the apportioned video signals to the plurality of display devices.

14. The method of claim 13, wherein the input video source signal is received from a wireless communications interface.

15. The method of claim 13, wherein the apportioned video signals are outputted to the plurality of display device from a wireless communications interface.

* * * * *